US008600384B1

(12) United States Patent
Moreno et al.

(10) Patent No.: US 8,600,384 B1
(45) Date of Patent: Dec. 3, 2013

(54) OPTIMIZATION OF INTERLAYER HANDOVERS IN MULTILAYER WIRELESS COMMUNICATION NETWORKS

(75) Inventors: Salvador Pedraza Moreno, Malaga (ES); Juan Ramiro Moreno, Malaga (ES); Angel Luis Rivada Antich, Malaga (ES)

(73) Assignee: Optimi Corporation, Atlanta, GA (US)

( * ) Notice: Subject to any disclaimer, the term of this patent is extended or adjusted under 35 U.S.C. 154(b) by 1350 days.

(21) Appl. No.: 11/847,172

(22) Filed: Aug. 29, 2007

(51) Int. Cl.
*H04W 36/00* (2009.01)
*H04W 72/00* (2009.01)
*H04W 4/00* (2009.01)

(52) U.S. Cl.
USPC ........... 455/436; 455/444; 455/437; 455/438; 455/439; 455/453; 370/331

(58) Field of Classification Search
USPC .......... 455/436–444, 33.2, 450–453; 370/331
See application file for complete search history.

(56) References Cited

U.S. PATENT DOCUMENTS

| 5,241,685 | A | * | 8/1993 | Bodin et al. ................. 455/453 |
| 6,141,565 | A | * | 10/2000 | Feuerstein et al. ............ 455/560 |
| 6,208,863 | B1 | | 3/2001 | Salonaho ...................... 455/444 |
| 6,405,046 | B1 | | 6/2002 | Kumaran et al. .............. 455/453 |
| 6,587,686 | B1 | * | 7/2003 | Cuffaro et al. ................ 455/423 |
| 2007/0002759 | A1 | * | 1/2007 | Diaz et al. ..................... 370/252 |
| 2007/0091844 | A1 | * | 4/2007 | Huang et al. .................. 370/331 |
| 2011/0014925 | A1 | * | 1/2011 | Antic et al. ................. 455/452.2 |

FOREIGN PATENT DOCUMENTS

WO    WO 03/037018 A1    5/2003

* cited by examiner

*Primary Examiner* — Jean A. Gelin
*Assistant Examiner* — Dung Hong
(74) *Attorney, Agent, or Firm* — Hope Baldauff, LLC

(57) ABSTRACT

Technologies are described herein for parameter optimization of at least one interlayer handover in a multilayer wireless cellular communication network. Performance information for the communication network is retrieved. The retrieved performance information for the communication network is then averaged over a predetermined period of time. A determination is made based on the performance information as to whether optimization of the communication network is required. If so, the interlayer handover is optimized by capturing a current set of configuration parameters for the interlayer handover, generating a new set of configuration parameters for the interlayer handover based on the retrieved performance information and the current set of configuration parameters, and applying the new set of configuration parameters to the communication network.

18 Claims, 6 Drawing Sheets

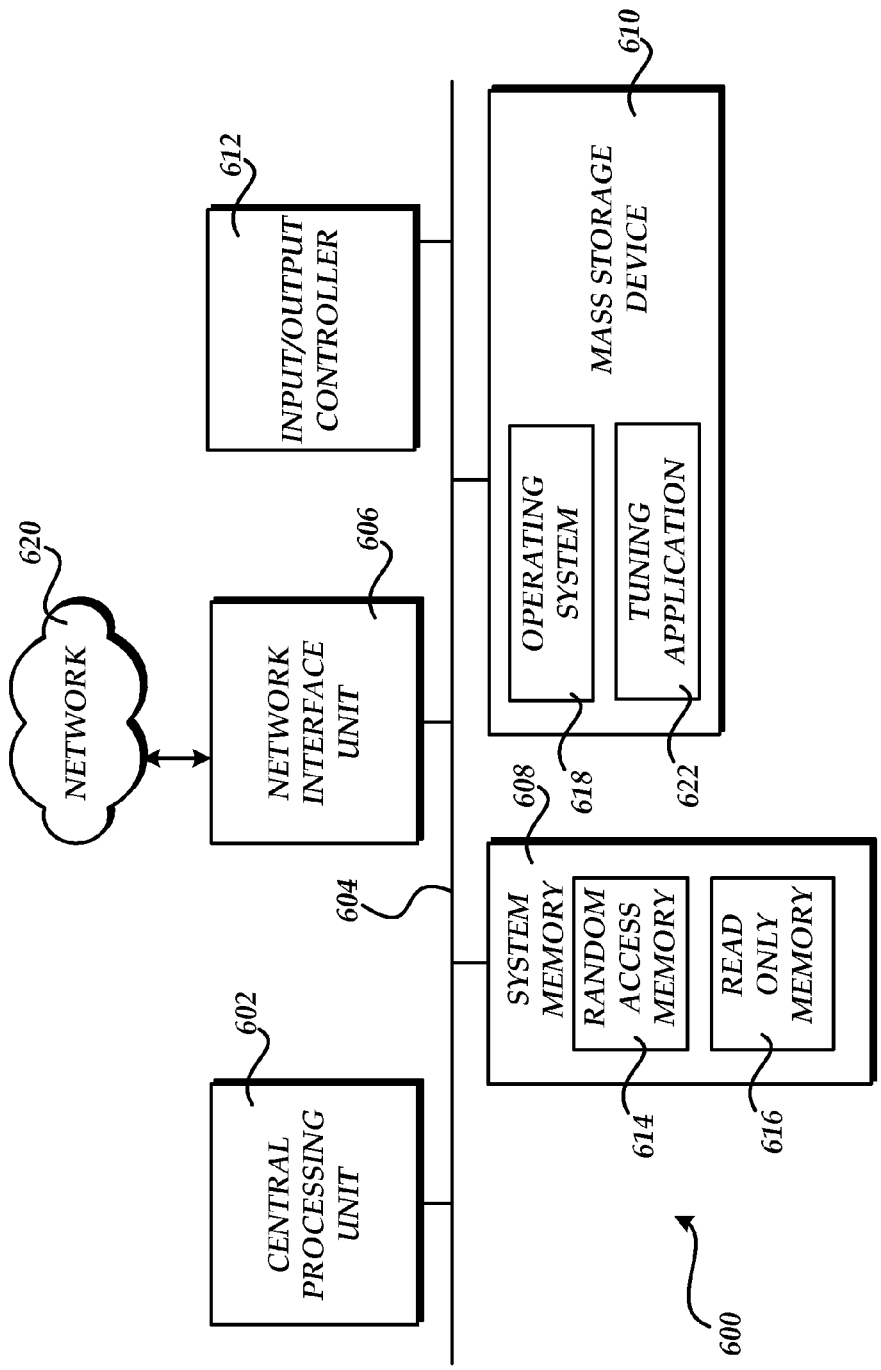

OPTIMIZATION OF INTERLAYER HANDOVERS IN MULTILAYER WIRELESS COMMUNICATION NETWORKS

BACKGROUND

Wireless cellular communications networks often divide the total set of available channels into different groups, or "layers." Layers within a network may belong to the same radio access technology. For instance, different layers can be defined as different sets of frequencies within a Global System for Mobile Communications ("GSM") communications network. It is also possible to have different layers served with different radio access technologies. For instance, GSM and Wideband Code Division Multiple Access ("WCDMA") layers can coexist within the same communications network. Wireless handsets connected to such wireless communications networks may be transferred between layers using an interlayer handover procedure that is triggered when a set of threshold conditions is fulfilled. The set of interlayer handover threshold conditions are typically defined by configuration parameters specified within the wireless communications network.

It can be very difficult and time consuming to optimize the configuration parameters that specify the interlayer handover threshold conditions on a cell-by-cell basis in a large wireless cellular communications network. As a result, wireless operators frequently utilize a generic set of configuration parameters for all of the cell sites within a communications network. Utilization of a generic set of configuration parameters in this manner, however, generally results in sub-optimal performance in terms of both quality and capacity. One reason for this is that interference and propagation severity can vary both in time and space over a wireless network, which is not taken into account when utilizing a generic set of configuration parameters across all cell sites.

Field trials may be performed in order to tune the configuration parameters for cell sites within a wireless communications network. However, the effects of modifying configuration parameters during the tuning process are difficult to quantify. As a result, the tuned configuration parameters are often selected conservatively, thereby limiting the achievable performance of the communications network. Moreover, such trials are normally focused on global parameters of one or more features under study. Optimization is rarely performed on a cell-by-cell basis due to the large associated cost. As a result, most wireless cellular communications networks are unable to obtain peak levels of quality and performance.

It is with respect to these considerations and others that the disclosure made herein is presented.

SUMMARY

Technologies are described herein for optimizing interlayer handovers in a wireless cellular communications network. Through the utilization of the technologies and concepts presented herein, the configuration parameters that specify the interlayer handover threshold conditions in a multilayer wireless cellular communications network can be optimized on a cell-by-cell basis to provide peak levels of quality and performance. Moreover, the optimization of the configuration parameters can be performed without the need for costly field trials.

According to one aspect, performance information is retrieved for a multilayer wireless cellular communication network. The performance information may be retrieved, for instance, from an Operation and Support System ("OSS") operating within the network. According to implementations, the performance information is identified by one or more Key Performance Indicators ("KPIs") of the network. For example, KPIs may include a carrier-to-carrier interference ratio ("C/I"), a received signal level, a user speed level, or a path loss indicator. The performance information may also be identified by reported alarm events in the communication network.

The retrieved performance information is averaged over a predetermined period of time. If the performance information indicates that optimization is required, an interlayer handover within the network may be optimized by capturing a current set of configuration parameters for the interlayer handover. A new set of configuration parameters are then generated based on the current set of configuration parameters and the retrieved performance information. The new set of configuration parameters is then applied to the communication network. This process may be repeated for each cell and layer in the communication network.

According to additional aspects, the interlayer handover is operative to hand over a wireless communication from one layer of the network to another layer in the network. The interlayer handover is triggered when at least one threshold condition is fulfilled. The threshold condition is defined by the current set of configuration parameters, described above.

In one implementation, the communication network includes a macrolayer that presents at least one macrocell and a microlayer that presents at least one microcell. In this implementation, generating the new set of configuration parameters for the interlayer handover may include relaxing a threshold condition for entering the microlayer when congestion in the macrocell is detected and congestion or quality degradation are not detected in the microcell. Alternatively, generating the new set of configuration parameters may include increasing a threshold condition for entering the microlayer when quality or congestion problems in the microcell are not detected.

In another implementation, the communication network includes at least two layers operating at different frequencies. In this scenario, the interlayer handover is a load based interfrequency handover. Generating a new set of configuration parameters for the interlayer handover includes monitoring a load in the two layers and adjusting a handover load threshold condition in order to achieve a balanced distribution of the load between the two layers.

The above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 6 is a computer architecture diagram showing an illustrative computer hardware and software architecture for a computing system capable of implementing the embodiments presented herein.

DETAILED DESCRIPTION

Figure 1:
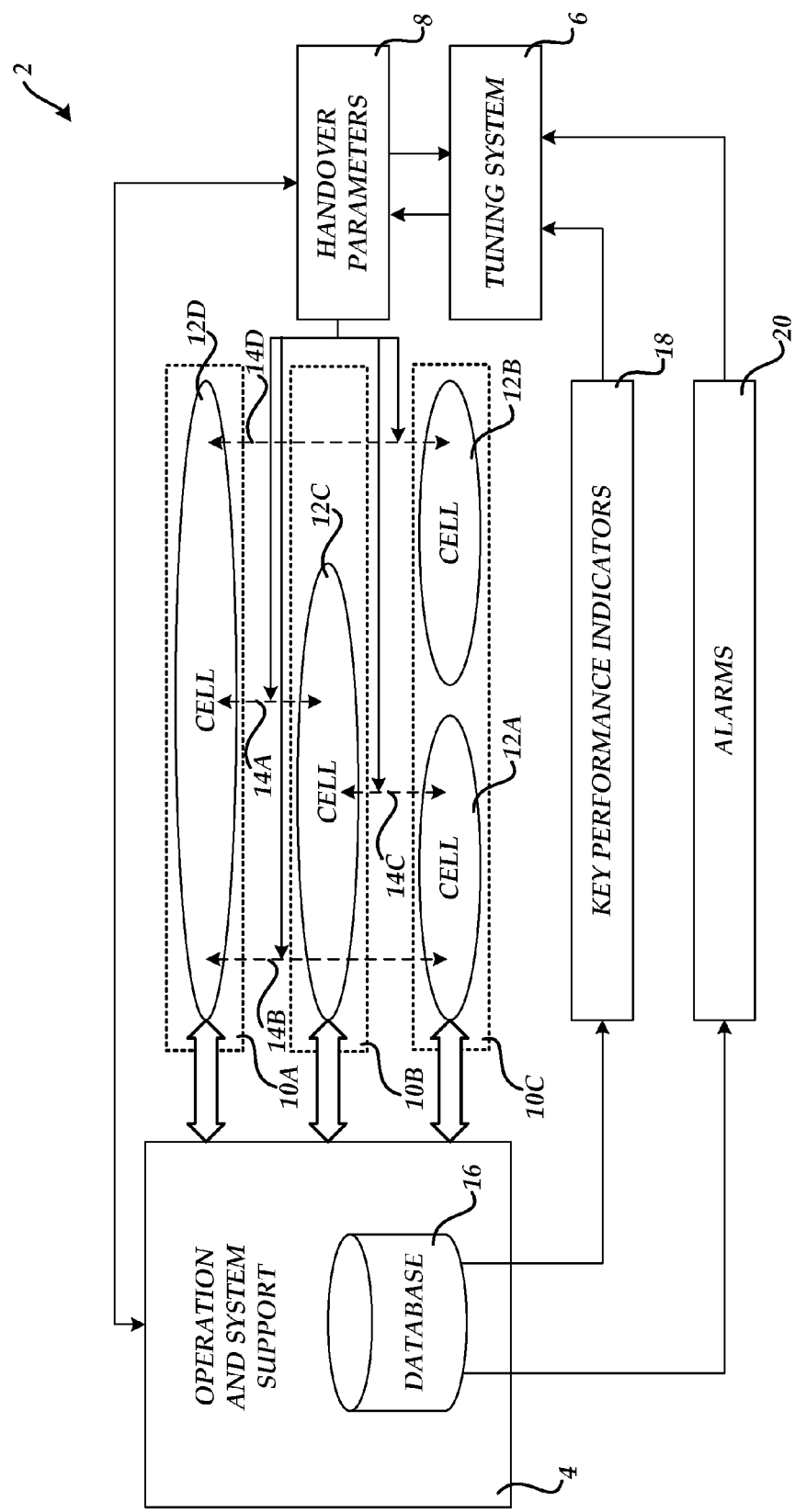
FIG. 1 is a block diagram showing an illustrative operating environment for aspects of the various embodiments presented herein along with aspects of a system for optimizing interlayer handovers in a cellular communication network presented herein.

The following detailed description is directed to technologies for optimizing interlayer handovers in a wireless cellular communications network. While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements through the several figures, aspects of a computing system and methodology for optimizing interlayer handovers in a wireless cellular communications network will be described.

Turning now to FIG. 1, details will be provided regarding one embodiment presented herein for optimizing interlayer handovers in a wireless cellular communications network. In particular, FIG. 1 is a block diagram showing an illustrative operating environment for aspects of the various embodiments presented herein along with aspects of a system for optimizing interlayer handovers in a cellular communication network presented herein. In this implementation, KPIs and alarm events reported within a communications network are utilized to derive modifications to threshold conditions governing interlayer handovers. Details regarding this process are provided below.

As can be seen in FIG. 1, a system 2 for optimizing interlayer handovers includes an Operation and Support System ("OSS") 4, and a tuning system 6 for optimizing network performance, including the optimization of one or more handover parameters 8. The system 2 shown in FIG. 1 is presented in the context of a wireless communications network that presents three layers 10A, 10B, and 10C. The layer 10C includes two cells 12A-12B, the layer 10B includes one cell 12C, and the layer 10A includes one cell 12D. Between the layers of the network there are interlayer handovers 14A-14D to hand wireless communications from one layer to another layer. For example, the interlayer handover 14A is between the cells 12C and 12D of the layers 10B and 10A, respectively. The interlayer handover 14B is between the cells 12A and 12D of the layers 10C and 10A, respectively. The interlayer handover 14C is between the cells 12A and 12C of the layers 10C and 10B, respectively. It should be appreciated that each cited interlayer handover 14 might comprise two interlayer handovers, one for each direction. For instance, the handover 14B comprises a handover to hand users from cell 12D of layer 10A to cell 12A of layer 10C and a handover to hand users from cell 12A to cell 12C.

In the wireless communications network shown in FIG. 1 each interlayer handover 14 is triggered when a certain set of threshold conditions is fulfilled. The threshold conditions are defined by one or more handover parameters 8. The tuning system 6 optimizes the handover parameters (also referred to herein as "configuration parameters") utilizing information retrieved from the database 16 and a current set of configuration parameters for the wireless communications network. The database 16 is maintained by the OSS 4 and stores information about the performance of the communications network. In particular, this data is stored in the form of KPIs 18, reported alarms 20, and other data. Additional information may be stored in the database 16, such as propagation data, drive-test data, and other types of data regarding the performance of the wireless communications network. The database 16 serves this information about the network performance to the tuning system 6.

As will be described in greater detail below, the tuning system 6 utilizes the KPIs 18, alarms 20, and the current set of configuration parameters for the communications network to calculate a new set of handover parameters. The new handover parameters are intended to optimize network performance according to a set of criteria that are taken into account when designing the tuning system 6. The tuning system 6 applies the new handover parameters to the communications network.

Figure 2:
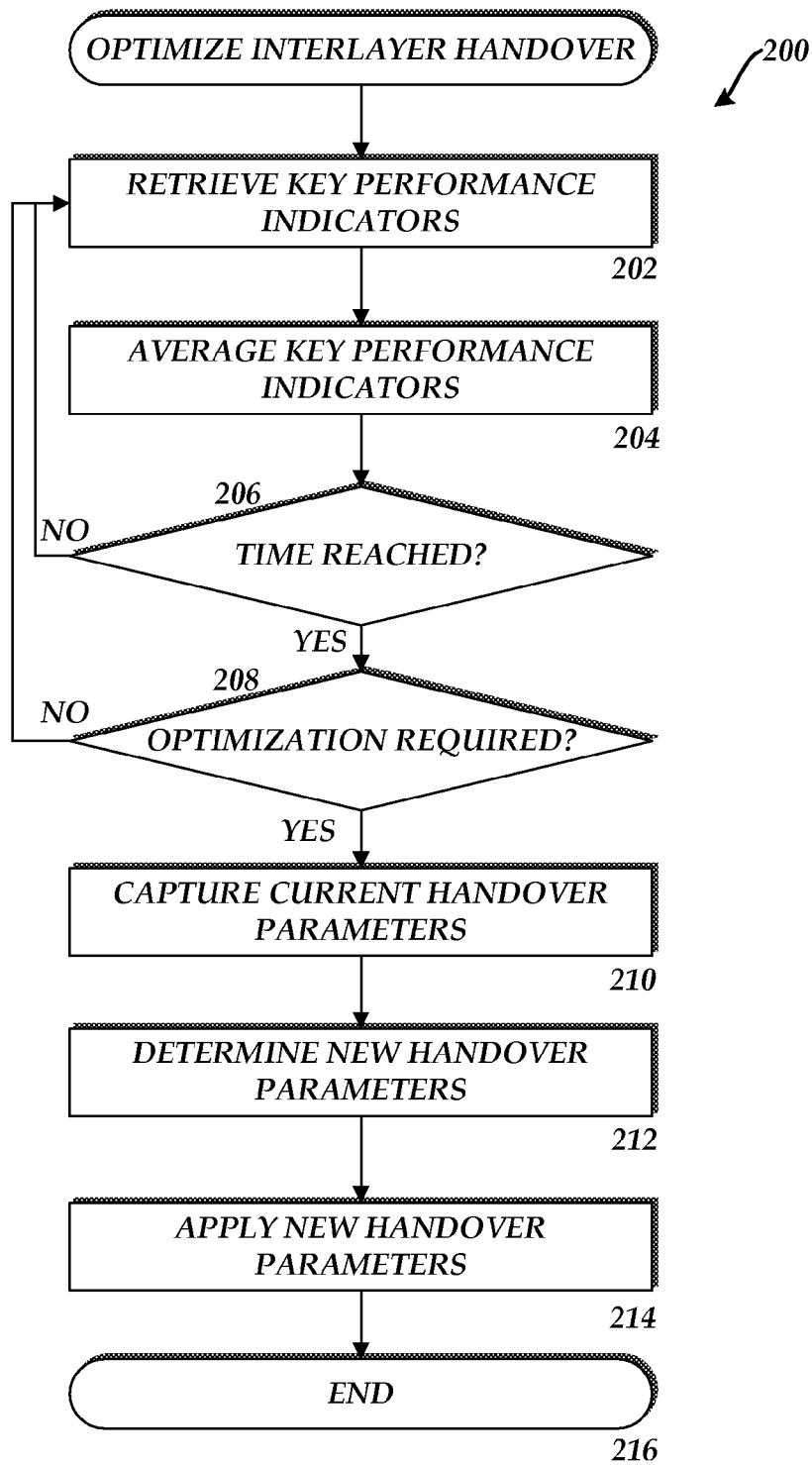
FIG. 2 is a flow chart illustrating one routine for parameter optimization of interlayer handovers in a multilayer wireless cellular communication network according to one embodiment.

Turning now to FIG. 2, additional details will be provided regarding the embodiments presented herein for optimizing interlayer handovers in a wireless communication network. In particular, FIG. 2 is a flow diagram showing a routine 200 illustrating a method performed by the tuning system 6 for optimizing the parameters of an interlayer handover in a multilayer wireless cellular communication network according to one implementation provided herein. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

The routine 200 begins at operation 202, where the tuning system 6 retrieves the KPIs 18 from the database 16. The alarms 20 may also be retrieved from the database 16 at operation 202. As discussed above, other information maintained by the OSS 4 may also be retrieved and utilized by the tuning system 6 in the generation of the new handover parameters. From operation 202, the routine 200 continues to operation 204, where the tuning system 6 averages the KPIs and other retrieved data with similar data previously retrieved from the database 16. It should be appreciated that the retrieved information should be averaged over a sufficiently long period of time, so that statistical noise is suppressed. Due to the necessary averaging periods, the method is suitable for long-term optimization tasks (e.g. daily or weekly updates of the system parameters). In this regard, the tuning system 6 may wait a predetermined period of time prior to averaging new performance data from the database 16. Accordingly, the tuning system 6 determines at operation 206 whether a predetermined period of time has elapsed since the performance data was last averaged. If not, the routine 200 returns to operation 202, described above. If the pre-determined period of time has elapsed, the routine 200 continues to operation 208, where the tuning system 6 determines whether optimization of the communication network is required.

If optimization is not required, the routine 200 returns to operation 202, described above. If optimization is required at operation 208, the routine 200 continues to operation 210, where the current set of handover parameters 8 of the interlayer handover is captured served to the tuning system 6. The routine 200 then continues to operation 212, where a new set of configuration parameters is determined by the tuning system 6. In particular, in one implementation the new set of configuration parameters is generated utilizing the network performance data retrieved from the database 16 and the current set of configuration parameters. Once the new set of handover parameters 8 have been generated, the new set of handover parameters is applied to the cell in the wireless network in which the interlayer handover is defined. Once the new handover parameters have been applied to the network, the routine 200 continues to operation 216, where it ends. It should be appreciated that the routine 200 illustrated in FIG. 2 may be applied continuously and repeatedly for all interlayer handovers occurring within a wireless network to ensure that network performance is continually optimized.

Figure 3:
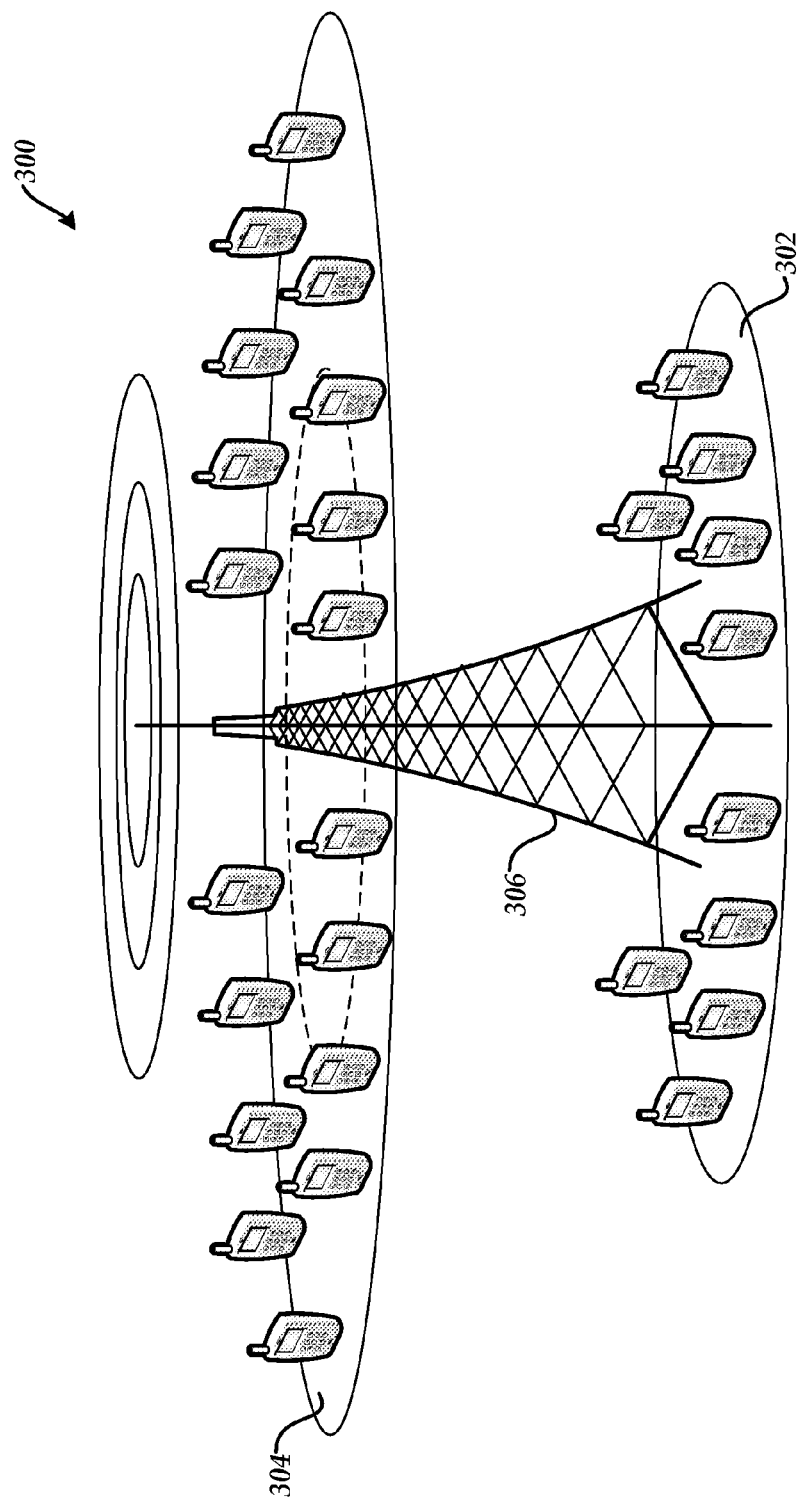
FIG. 3 is a schematic diagram illustrating a hierarchical macro and microcell structure of a multilayer wireless cellular communication network that forms an operating environment for embodiments presented herein.

FIG. 3 illustrates in a schematic diagram form how users are allocated to different layers in one hierarchical multilayer cell structure. In this regard, it should be appreciated that a typical objective of the multilayer strategies in wireless cellular communication networks is to provide continuous coverage with one layer, while increasing the capacity with other layers. For example, in a GSM system, continuous coverage is achieved by means of a layer with loose frequency reuse, while capacity is increased by using a tight frequency reuse in the other (insecure) layer. Of course, not all the users should access the insecure layer, since this is meant for users close to the base station, which are the ones having enough signal quality to cope with the interference situation created by the utilized frequency reuse. In general, the layer with loose frequency reuse, which is intended for coverage provision, is called the macrolayer, and the cells in this layer are called macrocells. Similarly, the insecure layer is called the microlayer, and the cells in this layer are called microcells due to their reduced dominance area.

The structure of a multilayer wireless cellular communication network 300 shown in FIG. 3 comprises a microcell 302, a macrocell 304, and a base station 306. As can be seen, the handsets located near the base station 306 are in the microcell 302 whereas handsets located further away from the base station 306 are in the macrocell 304. The condition that has to be fulfilled in order to trigger the handover of a user towards the microcell 302 is typically defined as the minimum carrier-to-interference ratio ("C/I") that has to be experienced by a handset. Instead of the C/I, other alternative measures can be also utilized, such as the path loss and the received signal level, among others. Equivalent criteria must also be defined for handing handsets over to the macrocell 304. Among others, these criteria can be based on C/I, path loss or quality measures.

In addition to the signal quality criteria, it is also desirable to keep fast moving handsets in the macrolayer provided by the macrocell 304, since the small size of the microcell 302 would generate an excessive number of handovers. For this purpose, a corresponding speed related threshold has to be defined and adjusted. Within this framework, a reasonable approach for threshold definition is to try to push as much traffic as possible towards the microlayer provided by the microcell 302, provided that no congestion or quality problems appear in this layer. The manner to push traffic towards the microlayer provided by the microcell 302 is to relax the threshold conditions that must be fulfilled in order to have a handset handed over to that layer. In this context, quality can be defined in terms of, for example, dropped call rate, and/or handover failure rate. When defining the congestion in a certain layer, this can be done, for example, in terms of call blocking rate and/or percentage of utilized transmission resources during a certain period (e.g. the busy hour).

In view of the above, an optimization algorithm utilized by the tuning system 6 in one implementation utilizes two rules: 1) the threshold condition for entering a microlayer is relaxed (which is equivalent to pushing traffic towards the microlayer) when there is congestion in the macrocell 304 and there are no congestion or quality problems in the microcell 302 and 2) the threshold conditions for entering a microlayer are made more demanding (which is equivalent to pushing traffic towards the macrolayer) when there are quality or congestion problems in the microlayer. In this context, relaxing a threshold condition for entering a cell means modifying the threshold so that more users can enter the cell. If the threshold condition is defined in terms of C/I, this relaxation operation involves a reduction of the C/I threshold condition.

Figure 4:
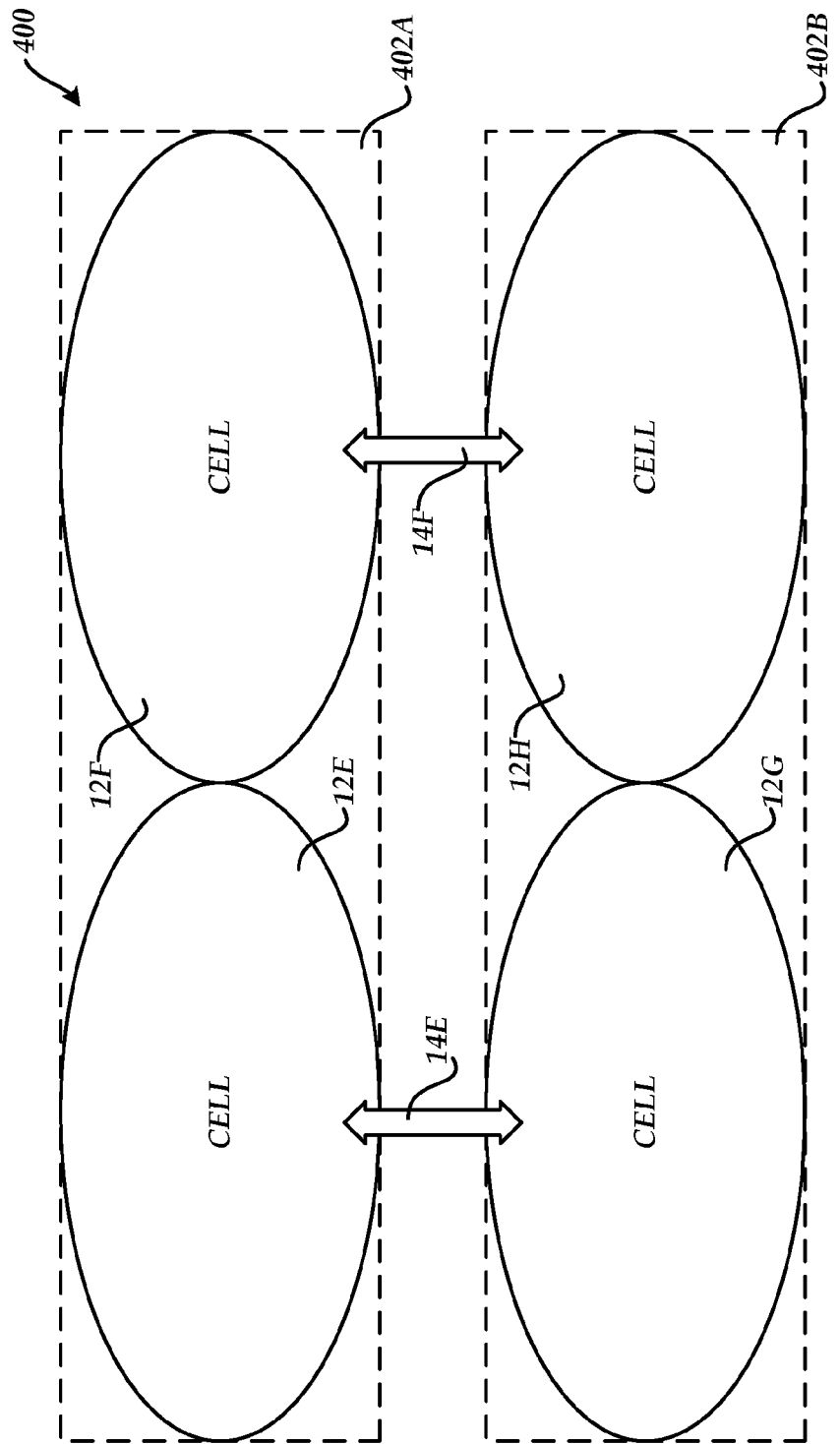
FIG. 4 is a schematic diagram illustrating a load based inter-frequency handover in a WCDMA communications network.

FIG. 4 illustrates in a schematic diagram form a network 400 in which several WCDMA layers 402A-402B with equal planned dominance area are deployed. The layers 402A-402B coexist and load-based interlayer handovers are possible in order to balance the load at the different cells. The network 400 comprises a first layer 402A operating at a first frequency that presents a first cell 12E and a second cell 12F. The network 400 also includes a second layer 402B operating at a second frequency that presents a first cell 12G and a second cell 12H.

The network configuration illustrated in FIG. 4 may comprise a multilayer WCDMA network in which each of the layers 402A-402B is identified by the use of a different frequency. Different mechanisms may be utilized to deploy such a multilayer structure. For instance, high capacity sites operating at different frequencies can be built, which implies that traffic balance operations between both layers can be based on load measures at each layer, with the subsequent load definitions in terms of system throughput, transmitted or received power or number of users, throughput per user and queuing time statistics, among others. In this case, no distinction between macrocells and microcells is made, since no different dominance area is planned for each type of cell.

Typically, this kind of multi carrier site will be initially deployed only in regions with high offered traffic.

In the network shown in FIG. 4, several threshold optimization strategies can be designed in different embodiments. In general, load based inter-frequency handovers 14E-14F are triggered when the load in the current cell exceeds a certain threshold. However, it is not desirable to start these handover procedures towards cells that are more loaded than the current cell. Similarly, it is also undesirable to have the traffic unevenly distributed among the different layers. Thus, one possible optimization strategy to implement by the tuning system 6 is to monitor the load in both of the layers 402A-402B and to adjust the handover parameters 8 in order to achieve a balanced distribution of the traffic among the layers 402A-402B.

Another manner to deploy a multilayer structure in WCDMA is to enable macro and microcells. As in the GSM system, continuous coverage will be provided with macrocells, while microcells will be deployed for capacity enhancement. In the WCDMA case, the same frequency reuse is used in each layer, though different transmit powers can be applied at different layers, with the subsequent difference in the coverage range. Due to the same reasons that were pointed out above with respect to the GSM case, it is also possible to keep fast moving handsets in the macrolayer, which also requires the definition and adjustment of the corresponding speed related threshold. In this case, it is possible for the tuning system 6 to use the same optimization strategies as in the GSM case (i.e. the system can try to push as much traffic as possible towards the microlayer, provided that no quality or congestion problems appear in this layer).

The definition of layers associated to different radio access technologies is also a realistic scenario. At the start of WCDMA deployment, this radio access technology will not provide full coverage. Thus, handovers from WCDMA to GSM will be a widely used method to guarantee continuous coverage. Moreover, load-based handovers in both directions will be useful in order to balance the load of both systems, taking into account that not all services can be provided over both radio access technologies. These transition policies will be translated into some rules and criteria, which will depend on thresholds that have to be compared with some measures in order to make a handover decision. Like in the aforementioned cases, the adjustment of the inter-system handover thresholds will be done, by the tuning system 6, in a way that causes as much traffic as possible to be pushed toward the desired system, provided that no quality or congestion problems are caused.

Figure 5:
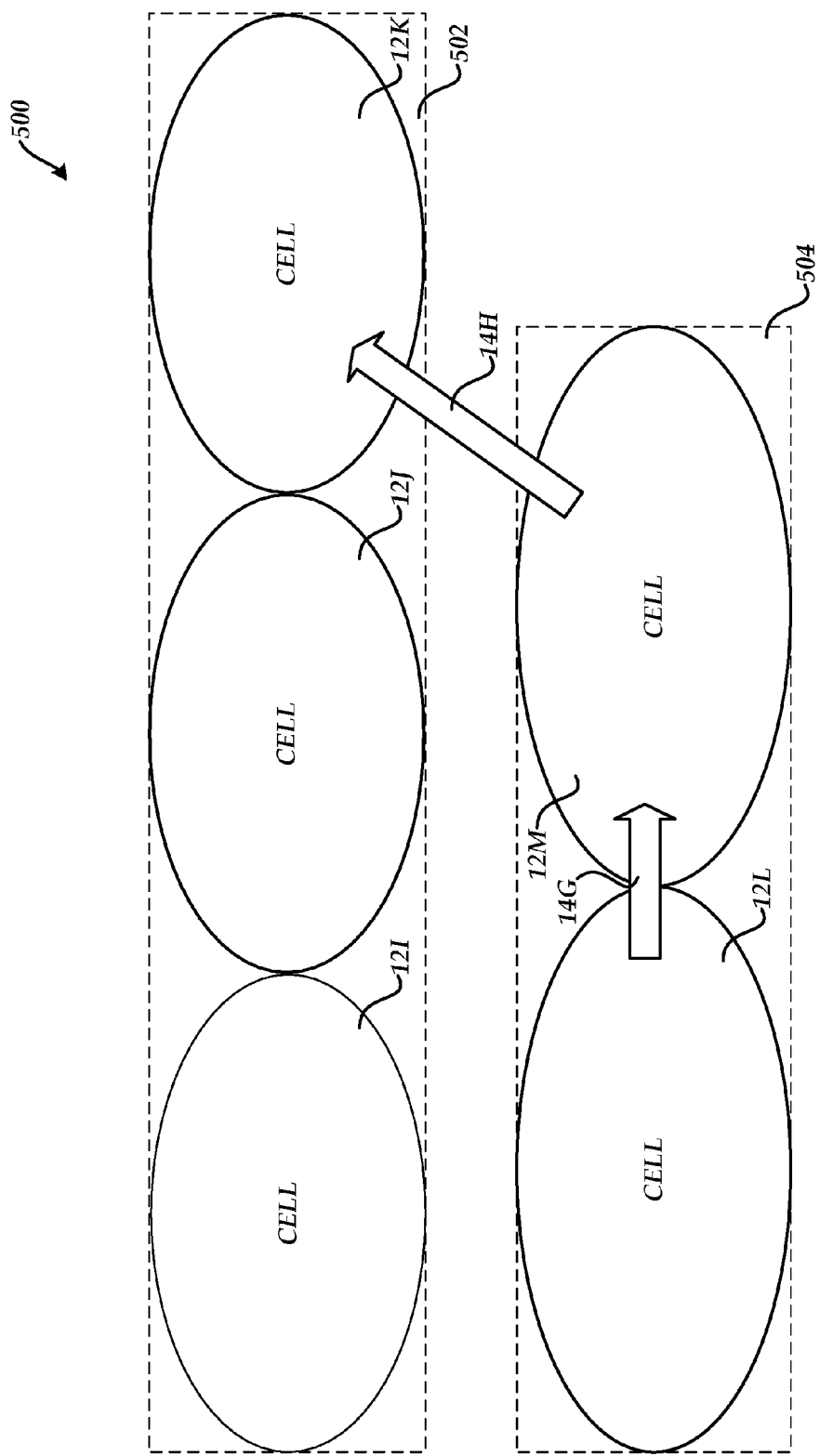
FIG. 5 is a schematic diagram illustrating a coverage based inter-frequency handover in a WCDMA communications network.

FIG. 5 illustrates in a schematic diagram form a situation in which the coverage with one of the WCDMA layers is discontinued, which forces an inter-frequency handover operation in order to guarantee mobility. The network 500 shown in FIG. 5 comprises a first layer 502 that presents three cells 12I-12K, and a second layer 504 that presents two cells 12L-12M. The layers 502 and 504 operate at different frequencies. In the example network shown in FIG. 5, multi carrier sites will be initially deployed only in regions with high offered traffic. Thus, when moving away from that region, it is likely that the coverage with some of the frequencies is discontinued. In that case, an inter-frequency handover 14H will be executed due to coverage reasons. For this operation, the tuning system 6 must define a threshold based on, for example, the quality of the received pilot signals from each cell. In particular, an interlayer handover 14H is triggered and the handsets are handed from the cell 12M of layer 504 to the cell 12K of the layer 502 because the coverage with the frequency used in the layer 504 is discontinued.

FIG. 6 shows an illustrative computer architecture for a computer 600 capable of executing the software components described herein. In particular, the computer 600 may be utilized in the tuning system 6 to execute a tuning application program 622 capable of performing the software operations described herein for optimizing a wireless communication network. The computer architecture shown in FIG. 6 illustrates a conventional desktop, laptop computer, or server computer and may be utilized to execute any aspects of the methods presented herein for optimizing a wireless network.

The computer architecture shown in FIG. 6 includes a central processing unit 602 ("CPU"), a system memory 608, including a random access memory 614 ("RAM") and a read-only memory ("ROM") 616, and a system bus 604 that couples the memory to the CPU 602. A basic input/output system containing the basic routines that help to transfer information between elements within the computer 600, such as during startup, is stored in the ROM 616. The computer 600 further includes a mass storage device 610 for storing an operating system 618, application programs, and other program modules, which will be described in greater detail below.

The mass storage device 610 is connected to the CPU 602 through a mass storage controller (not shown) connected to the bus 604. The mass storage device 610 and its associated computer-readable media provide non-volatile storage for the computer 600. Although the description of computer-readable media contained herein refers to a mass storage device, such as a hard disk or CD-ROM drive, it should be appreciated by those skilled in the art that computer-readable media can be any available computer storage media that can be accessed by the computer 600.

By way of example, and not limitation, computer-readable media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 600.

According to various embodiments, the computer 600 may operate in a networked environment using logical connections to remote computers through a network such as the network 620. The computer 600 may connect to the network 620 through a network interface unit 606 connected to the bus 604. It should be appreciated that the network interface unit 606 may also be utilized to connect to other types of networks and remote computer systems. The computer 600 may also include an input/output controller 612 for receiving and processing input from a number of other devices, including a keyboard, mouse, or electronic stylus (not shown in FIG. 6). Similarly, an input/output controller may provide output to a display screen, a printer, or other type of output device (also not shown in FIG. 6).

As mentioned briefly above, a number of program modules and data files may be stored in the mass storage device 610 and RAM 614 of the computer 600, including an operating system 618 suitable for controlling the operation of a networked desktop, laptop, or server computer. The mass storage device 610 and RAM 614 may also store one or more program modules. In particular, the mass storage device 610 and the RAM 614 may store a tuning application program 622 that provides the functionality described herein for optimizing a wireless communication network. Other program modules and data may also be stored on the mass storage device 610 and in the RAM 614.

Based on the foregoing, it should be appreciated that technologies for parameter optimization of at least one interlayer handover in a multilayer wireless cellular communication network are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method for parameter optimization of at least one interlayer handover in a multilayer wireless cellular communication network, the method comprising:
   retrieving performance information for the communication network, wherein the communication network comprises a macrolayer that presents at least one macrocell and a microlayer that presents at least one microcell;
   averaging the retrieved performance information for the communication network over a predetermined period of time;
   determining based on the averaged performance information whether optimization of the communication network is required; and
   in response to determining that optimization of the communication network is required, optimizing the interlayer handover by capturing a current set of configuration parameters for the interlayer handover, generating a new set of configuration parameters for the interlayer handover based on the retrieved performance information and the current set of configuration parameters by relaxing a threshold condition for entering the microlayer when congestion in the macrocell is detected and congestion or quality degradation are not detected in the microcell, and applying the new set of configuration parameters to the communication network.

2. The method of claim 1, wherein the multilayer wireless cellular communication network comprises a plurality of cells and a plurality of layers, and wherein the retrieving, averaging, determining, and optimizing operations are performed for each cell of each layer of the communication network.

3. The method of claim 2, wherein the performance information comprises data identifying one or more Key Performance Indicators (KPIs) of the communication network.

4. The method of claim 3, wherein the performance information comprises data identifying one or more reported alarm events in the communication network, and wherein generating a new set of configuration parameters for the interlayer handover comprises generating a new set of configuration parameters for the interlayer handover based on the data identifying one or more reported alarm events in the communication network.

5. The method of claim 4, wherein the communication network further comprises an Operation and Support System (OSS), and wherein retrieving performance information for the communication network comprises retrieving the performance information from the OSS.

6. The method of claim 5, wherein the interlayer handover is operative to hand over a wireless communication from a first layer to a second layer of the communication network.

7. The method of claim 6, wherein the interlayer handover is triggered when at least one threshold condition is fulfilled.

8. The method of claim 7, wherein the threshold condition is defined by the current set of configuration parameters.

9. The method of claim 8, wherein the KPIs comprise one or more of a carrier-to-carrier interference ratio (C/I), a received signal level, a user speed level, or a path loss indicator, and wherein the threshold condition is defined by at least one of the KPIs.

10. The method of claim 9, wherein the communication network comprises at least two layers operating at different frequencies and the interlayer handover is a load based inter-frequency handover, and wherein generating a new set of configuration parameters for the interlayer handover comprises monitoring a load in the two layers and adjusting a handover load threshold condition in order to achieve a balanced distribution of the load among the two layers.

11. The method of claim 1, wherein generating a new set of configuration parameters for the interlayer handover based on the retrieved performance information and the current set of configuration parameters comprises increasing a threshold condition for entering the microlayer when quality or congestion problems in the microcell are not detected.

12. A system for parameter optimization of at least one interlayer handover in a multilayer wireless cellular communication network comprising a macrolayer that presents at least one macrocell and a microlayer that presents at least one microcell, the system comprising:
   a tuning system configured to
   retrieve information about the network performance,
   average the retrieved information about the network performance over a predetermined period of time,
   receive a current set of configuration parameters for the interlayer handover that are captured from the network,
   determine a new set of configuration parameters for the interlayer handover according to at least one criterion, on the basis of the retrieved information about the network performance, and the captured current set of configuration parameters for the interlayer handover by relaxing a threshold condition for entering the microlayer when congestion in the macrocell is detected and congestion or quality degradation are not detected in the microcell, and
   to cause the determined new set of configuration parameters for the interlayer handover to be applied to the communication network.

13. The system of claim 12, wherein the information about the network performance comprises one or more Key Performance Indicators (KPIs) of the communication network.

14. The system of claim 13, wherein the information about the network performance comprises data identifying one or more reported alarm events in the communication network.

15. The system of claim 14, wherein the interlayer handover is operative to hand over a wireless communication from a first layer to a second layer of the communication network.

16. The system of claim 15, wherein the interlayer handover is triggered when at least one threshold condition is fulfilled, the threshold condition being defined by the captured current set of configuration parameters.

17. The system of claim 16, wherein the KPIs comprise one or more of a carrier-to-carrier interference ratio (C/I), a received signal level, a user speed level, or a path loss indicator, and wherein the threshold condition is defined by at least one of the KPIs.

18. A computer-readable storage medium that is not a signal comprising computer-executable instructions stored thereon, which, when executed by a computer, cause the computer to:

retrieve performance information for a communication network comprising a macrolayer that presents at least one macrocell and a microlayer that presents at least one microcell;

take an average of the retrieved performance information for the communication network over a predetermined period of time;

determine based on the averaged performance information whether optimization of the communication network is required; and in response to determining that optimization of the communication network is required, optimize an interlayer handover by capturing a current set of configuration parameters for the interlayer handover, generating a new set of configuration parameters for the interlayer handover based on the retrieved performance information and the current set of configuration parameters by relaxing a threshold condition for entering the microlayer when congestion in the macrocell is detected and congestion or quality degradation are not detected in the microcell, and applying the new set of configuration parameters to the communication network.

\* \* \* \* \*